United States Patent [19]

Bonnefous

[11] Patent Number: 5,156,153
[45] Date of Patent: Oct. 20, 1992

[54] DEVICE FOR ELIMINATING FIXED ECHOES FOR AN ULTRASONIC ECHOGRAPH

[75] Inventor: Odile Bonnefous, Nogent, France

[73] Assignee: U.S. Philips Corporation, New York, N.Y.

[21] Appl. No.: 700,783

[22] Filed: May 15, 1991

[30] Foreign Application Priority Data

May 18, 1990 [FR] France ................ 90 06255

[51] Int. Cl.$^5$ .............................................. A61B 8/06
[52] U.S. Cl. ............................. 128/661.09; 73/861.25
[58] Field of Search ......... 128/660.01, 600.05–660.07, 128/661.08–661.10; 73/861.25

[56] References Cited

U.S. PATENT DOCUMENTS

| 4,803,990 | 2/1989 | Bonnefous et al. | 128/661.08 |
| 4,883,060 | 11/1989 | Pesque et al. | 128/660.01 |
| 4,888,694 | 12/1989 | Chesarek | 128/660.01 X |
| 5,062,430 | 11/1991 | Bonnefous | 128/661.08 X |

Primary Examiner—Francis Jaworski

[57] ABSTRACT

An ultrasonic system includes a recurrent pulse emitter including an intercorrelation circuit for determining blood flow profiles. Three filters in parallel eliminate fixed echoes with passband and delay lines, the passbands of which filters are juxtaposed. Amplitude detectors connected to the input of a comparator detect the filter output signals amplitude and delay elements are connected between the output of each filter and a multiplexor, the latter receiving a control signal (CO) issued by the comparator to select at its output that one among the output signals of the filters which presents the highest amplitude.

10 Claims, 3 Drawing Sheets

DEVICE FOR ELIMINATING FIXED ECHOES FOR AN ULTRASONIC ECHOGRAPH

FIELD OF THE INVENTION

The present invention relates to a device for eliminating fixed echoes for an ultrasonic echograph with recurrent pulse emission provided with an intercorrelation and interpolation circuit, with a view to the determination of velocity profiles of moving media, comprising at least one filter for eliminating fixed echoes of the passband type with delay lines.

BACKGROUND OF THE INVENTION

A particularly advantageous application of this device consists in measuring velocity profiles of blood flow rates by ultrasonic echography.

The general technical problem to be solved by any ultrasonic echograph destined for measuring and, complementarily, displaying blood flow rates is to eliminate the fixed echoes due to the great reflectivity the biological tissues (in this case the walls of the vessels) which may exceed 40 dB of the reflectivity of blood (red corpuscles). Hence the use of a device for eliminating fixed echoes is indispensable, before any estimation of the velocity profile, to reduce the dynamic of the signals to be treated and to correctly measure the flow rates of anyone section of the vessels, in particular the low velocities which appear in the vicinity of the walls of the vessels and which for that reason are masked by the strong signals coming from the said walls.

A simple solution to this general technical problem consists, for example, in a device for eliminating fixed echoes for an ultrasonic echograph, of introducing a filter, of the delay line type, composed of a line delayed by a recurrence period in parallel on a zero delay line. Weighting coefficients, $+1$ and $-1$, respectively, are assigned to the lines which, after weighting, are added up by an adder. So the known filter realizes the difference between two successive echographic lines, which, in principle, leads to a quasi-complete diminishing of the echoes produced by the fixed tissues. However, this technique suffers from the serious disadvantage of also attenuating the signals corresponding to the low flow rates. For example, it may be demonstrated that the response of the above filter as a function of the flow rate is such that, for a recurrence frequency of $1/T = 5$ kHz, and an emission frequency of $N_c = 5$ MHz, a signal corresponding to $V = 5$ cm/s is attenuated by 30 dB.

This makes the measuring of the flow rates there where they are weakest, i.e. near the vessel walls, difficult, indeed impossible. So it is very important to know the velocities, for example, for the study and the clinical diagnostics of the arteries.

On the other hand it is known that the gradient of the filter mentioned above can be augmented in the gap zone by augmenting its order. Applied to the measuring of the velocities by echography, this comes to no longer treating 2 successive echographic lines but more, say M, by means of a delay line-type filter composed of M parallel delay lines i, respectively $(i-1)T$. In order to ensure the elimination of the fixed echoes, the M lines are weighted by coefficients the sum of which is zero. All the lines are then added up for being subsequently treated by a velocity estimating circuit, by correlation, phase shifting, etc. . . . Still it is difficult with this type of filter to obtain at the same time a good measure of the studied flow rate profile and a high image rate. If N is the number of lines to be treated (typically $N=16$ for the peripheral vessels and $N=8$ for the heart), and if M lines are used for the filter for eliminating fixed echoes, in fact only $N-M+1$ lines remain which may be used for the velocity estimation, or, for having the same number of lines to be treated, the imaging rate would have to be diminished.

A device for eliminating fixed echoes for ultrasonic echograph is also known from French Patent Application 2 617 982 which corresponds to commonly owned U.S. Pat. No. 4,883,060 in the name of the Applicant and P. R. Pesque comprising, connected in parallel, at least two filters of the same structure combined and shifted in phase among them by $(M-1)T$, each filter being composed on the one hand of M parallel lines i $(i=1, \ldots, M)$, delay lines $(i-1)T$, respectively, T being the recurrence period of the echograph, on the other hand of weighting means of the M lines i, the sum of the coefficients affected to the lines being zero, and, finally, of an adder of the lines i thus delayed and weighted, due to which device a satisfactory estimation of the low blood flow rates can be obtained, notably in the proximity of the vessel walls, without important diminishing of the lines to be treated, so without reduction of the imaging rate. In this manner two filters are obtained of the order $M-1$ having in module the same frequency response. So at the output of these filters are available: $2(N-M+1)$ signals to estimate the velocities instead of $N-M+1$. These signals are not entirely independent, but with a velocity estimator using a non-downstream linear operation (correlation 1 bit, phase shift, . . . ), an appreciable amelioration is thus obtained. Meanwhile, a correlation finer than the correlation 1 bit would attenuate the amelioration effects thus obtained. The precise technical problem which the present invention proposes to solve consists, while maintaining a high number of lines which may be used for the velocity estimation, of obtaining a filtering, for the rejection of the fixed echoes, which is correct for the low velocities to be measured while remaining near the optimum for the higher velocities.

SUMMARY OF INVENTION

The main object of the invention is to realize a device for eliminating fixed echoes which effect a correct filtering for the whole useful velocity range to be measured typically between 0 and 100 cm/s.

This object is achieved and the drawbacks of the prior art are attenuated or suppressed due to the fact that the device for eliminating fixed echoes as defined in the opening paragraph is characterised in that it comprises a plurality of filters for eliminating fixed echoes of the described type in parallel, the passbands of which are juxtaposed, an amplitude detector being connected to the output of each of the filters and to the input of a comparator, delay elements being connected between the output of each filter and a multiplexor, the latter receiving a control signal issued by the comparator to select at the output of the multiplexor that one among the output signals of the filters which has the highest amplitude.

In this manner a multifiltering is obtained, each filter being adapted to a particular range of velocities. The choice consisting of selecting via the multiplexor the filter which provides the data having the highest amplitude justifies itself by the fact that it is endeavoured to obtain an amplitude, for the useful signal cleared from the fixed echoes, which is just below the noise level, particularly for the low velocities. Moreover, the use of several filters the passbands of which are juxtaposed, permits of selecting a filter reserved for the lowest velocities of which the gradient is strong while preserving for the filter (and also for the other parallel filters) an order which is not very high. As far as the order n of the filters is concerned, it has been found experimentally that it is not possible to ameliorate in a significant manner the device for suppressing fixed echoes according to the invention when filters are used having 3 coefficients. On the other hand, the results obtained with filters having 5 coefficients are nearly comparable to those obtained with filters having 4 coefficients although at the expense of a greater complexity and also, according to certain embodiments based on the multifiltering, at the increased risk of discontinuities appearing in the measured velocity profiles, for which reason the embodiments, in which the functions of suppressing fixed echoes and of intercorrelation are totally dissociated, are not maintained. Preferably, the filters for eliminating fixed echoes according to the invention are filters having 4 coefficients, the sum of the coefficients being zero, the said latter characteristic feature being the first known condition for the suppresion of fixed echoes, namely:

$$\sum_{k=0}^{n} a_k = 0$$

According to a preferred embodiment of the invention the filters for suppressing fixed echoes are designed and selected to make the function $A(\phi)$ of the signal-to-noise ratio between the output and the input of the filters maximum:

$$A(\phi) = \frac{\left| \sum_{k=0}^{n} a_k e^{-jk\phi} \right|}{\sqrt{\sum_{k=0}^{n} a_k^2}}$$

with: $\phi = 4\pi N_c VT/C$ in which:
$N_c$: frequency of the echographic signal during the pulse,
V: velocity of the blood flow corresponding to the selected filter,
T: recurrence period of the pulse of the echographic signal,
C: velocity of the sound in the analyzed medium,
the sum of the squares of the coefficients being normed:

$$\sum_{k=0}^{n} a_k^2 = K$$

K being a constant.

The search of the filters is effected as follows: for each fixed velocity V it is tried to maximize the signal-to-noise ratio $A(\phi)$ making the coefficients $(a_k)$ vary while respecting the condition. (1). A dynamic is chosen on the coefficients, that is to say a regular variation step between a maximum (positive) value and a minimum (negative) value of the same absolute value as the preceding one, and all possible combinations of the coefficients $a_k$ ($k \epsilon [0, n]$), are considered so that the conditions (1) and (3) are verified. For each velocity value the combinations of coefficients are then detained which give, for $A(\phi)$, the highest values. For a certain range of velocities are then detained, among the various combinations corresponding to the same number of velocity points of the range in question, the combination which is common to the various points. Being given the small number of coefficients of the required filters (preferably 4 as indicated hereinbefore), this step permits of selecting a small number of filters (of the order of 3 filters) for the range of useful velocities.

A preferred embodiment of the device in accordance with the invention remarkable in that it comprises the 3 filters for eliminating fixed echoes having four coefficients:

a filter for low velocities: $a_0 = 2/\sqrt{10}$, $a_1 = 1/\sqrt{10}$, $a_2 = -1/\sqrt{10}$, $a_3 = -2/\sqrt{10}$, a filter for medium velocities: $a_0 = \frac{1}{2}$, $a_1 = -\frac{1}{2}$, $a_2 = -\frac{1}{2}$, $a_3 = \frac{1}{2}$, a filter for high velocities: $a_0 = \frac{1}{2}$, $a_1 = -\frac{1}{2}$, $a_2 = \frac{1}{2}$, $a_3 = -\frac{1}{2}$.

The invention will now be described in greater detail with reference to the accompanying drawing.

DESCRIPTION OF THE PREFERRED EMBODIMENT

Figure 1:
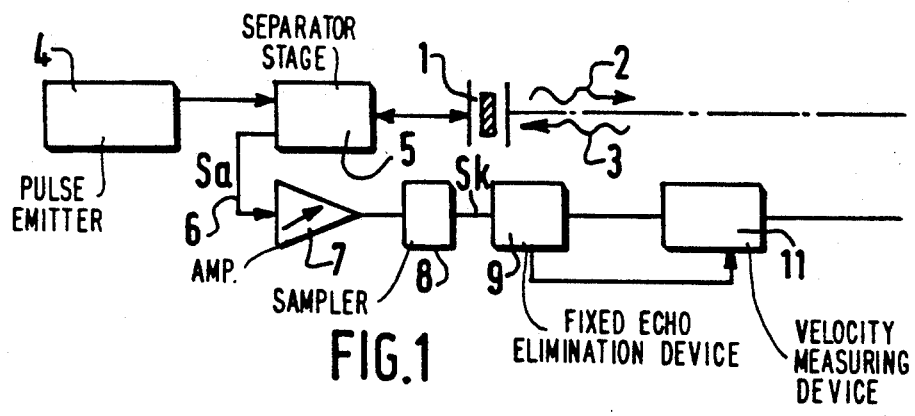
FIG. 1 is a block diagram of an ultrasonic echograph emitting pulses of the profilometer type and comprising a device for eliminating fixed echoes according to an embodiment of the invention.

FIG. 1 shows diagrammatically a device for measuring velocities of moving organs and blood flows. The device, termed profilometer, is based on the principle of the emission of short pulses (of the order of 1 $\mu$s width) according to a recurrence N of the order of a few kHz ($N_i = 1/T$, for example, equal to 5 kHz). Generally, the profilometer forms part of a more complex apparatus for examination by ultrasonic echography which may comprise in addition a two-dimensional display device of the tissues and the analysed blood flows. FIG. 1 shows an ultrasonic transducer 1 which emits (arrow 2), during each pulse, an acoustic wave centered around a central frequency $N_c$ of, for example, 5 MHz. An echo signal at different depths of the examined tissues is received during the whole duration T which separates two successive pulses. The pulse emitter is referenced 4. Reference numeral 5 denotes a known separator stage which permits of using the same transducer 1 for emission and reception. At the output of the stage 5 an analog signal Sa is obtained on a conductor 6. The signal Sa is treated by a receiving and treating chain constituted by a variable gain amplifier 7, a sampler 8, a device for eliminating fixed echoes 9 and a device for measuring velocities 11. The object of the variable gain amplifier 7 is as follows: the amplitude of the received echoes decreases when the distance of the Reflections increases, essentially due to the absorption of the ultrasounds by the traversed tissues. For this reason it is necessary to compensate for the said attenuation of the ultrasound signals to reduce as much as possible the dynamics of the numerical signal applied to the eliminator of fixed echoes 9. The law of the gain variations of the amplifier 7 (of the order of 1 dB/μs to 6 MHz) must be perfectly reproducible, at best 0.01 dB. After sampling at a frequency Fsi, for example, equal to 20 MHz, by sampler 8, which corresponds to an oversampling by approximately two, the signal is presented in the form of samples $S_k(t)$ at the input of the fixed echo elimination device 9. The assembly of devices and 11, which constitutes the heart of the invention, is shown in greater detail in FIG. 2.

The signal $S_k(t)$ is applied to a plurality of filters F1, F2, F3, referenced 13, 14 and 15, respectively, each being a filter for eliminating fixed echoes of the passband type with delay lines as described hereinafter with reference to FIGS. 4a and 4b. The passbands of the filters F1, F2, F3 are juxtaposed and the response curves RF1 RF2 and RF3 of the filters may be plotted as a function of the Doppler velocity V to be measured (see FIG. 5), in such a manner that the different response curves which are homothetic with the frequency response curves, overlap each other in the zone of the low velocities situated approximately between 10 and 30 cm/s. The output signals of the filters 13, 14, 15 are sampled at the same frequency Fsi as the input signal $S_k(t)$, noted $D^1j$, $D^2j$, $D^3j$, respectively. The signals $D^1j$, $D^2j$, $D^3j$ are each applied to amplitude detectors A1(16), A2(17), A3(18), respectively, and also to a respective corresponding delays 19, 21, 22. The output of each amplitude detector is connected to a corresponding input of a comparator 23 and the output of each delay is connected to a corresponding input of a multiplexor 24. The comparator 23 selects in sequence the highest amplitude among the signals $D^1j$, $D^2j$, $D^3j$ and, by means of a control signal CO on a multiple conductor 25, selects, in the multiplexor 24, the signal Dj of the highest amplitude which is for that reason applied to the output 26 of the multiplexor 24, the output signal of output 26 designated reference $D^R$. Besides the logic control signal CO which is transformed in comparator 23 by threshold circuits and logic gates (not shown) the choice and construction of which are known to the skill of those skilled in the art, the maximum amplitude value applied by one of the amplitude detectors A1, A2, A3 is selected by the comparator 23 and transmitted in the form of the signal $A_R$ to the measuring device 11 with the objects explained hereinafter. The delays 19, 21, 22 are realized, for example, in the form of shift registers operating at the sampling frequency of the input signal Fsi; their function is to delay the output signals of the filters by a time which is at least equal to the estimation of the corresponding amplitude, namely the time necessary for the treatment of the signal via the amplitude detectors and the comparator 23.

Figure 3:
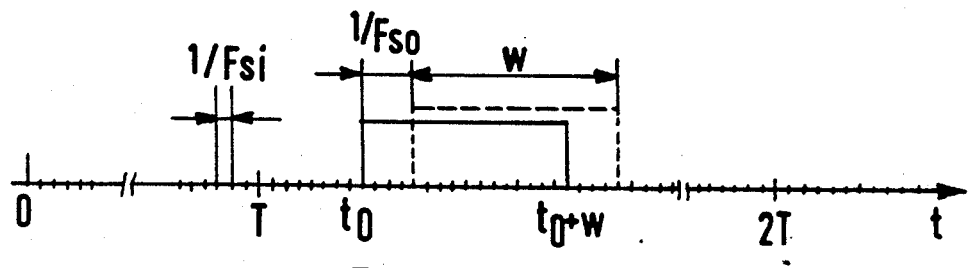
FIG. 3 is a time diagram permitting the explanation of certain functional frequencies of the FIG. 2 device.
Figure 2:
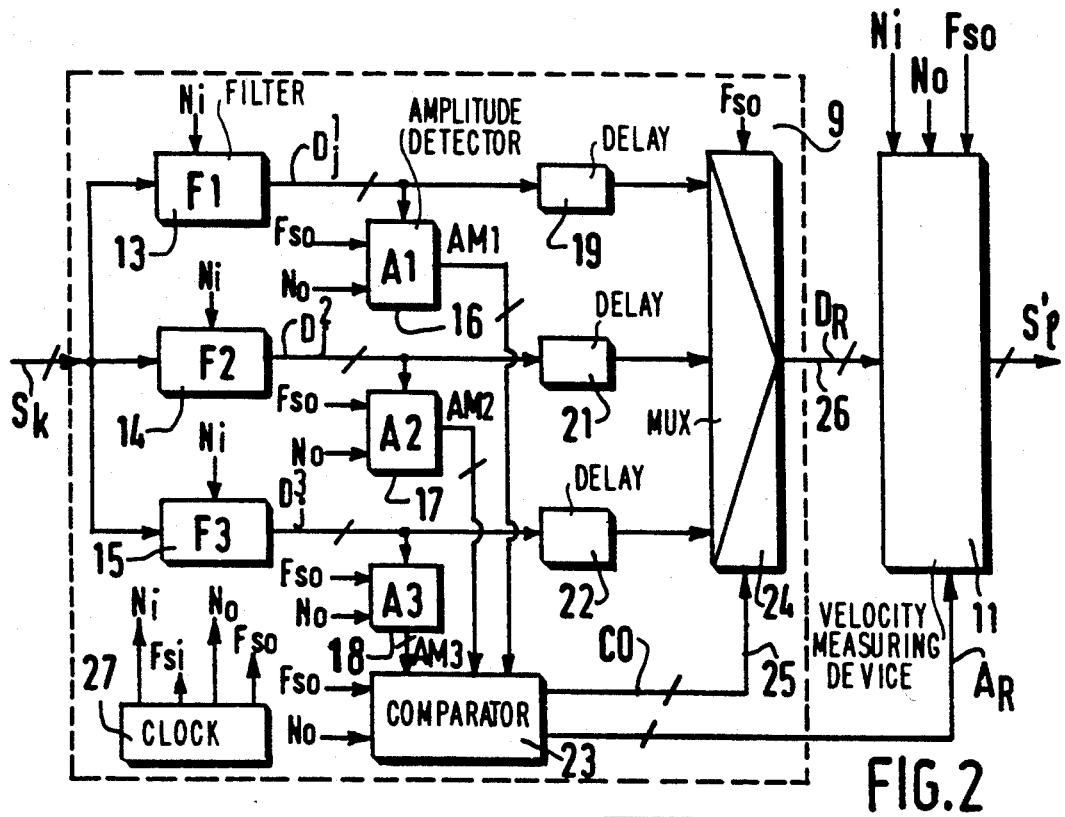
FIG. 2 is A block diagram of A device for eliminating fixed echoes according to the invention, associated with an intercorrelation and interpolation circuit termed: device for measuring velocities.

In order to better explain the operation of the electronic circuit of FIG. 2, a clock generator 27 is shown which emits four clock signals represented by their frequency values: Ni, Fsi, No, Fso, respectively, the clock signals being used in a manner conventionally used in the technique of ultrasonic echography. No is the recurrence of output, chosen as a sub-multiple of Ni, namely:

$$No = \frac{Ni}{N}$$

in which equation N is the number of emission pulses (or "shots") taken into account to establish a velocity profile. The correlation between successive signal pairs is effected and the N−M correlation functions are produced as already indicated hereinbefore (M=4 in the example considered here). Fso is the sampling output frequency, the various samples obtained at the output representing the successive velocity points of the searched velocity profile. Fso is a submultiple of the input sampling frequence; for example: FsO=Fsi/4 (see FIG. 3). In these conditions the signal Fsi ensures the synchronization at the input sampling frequency in all the elements shown in FIG. 2, apart from the multiplexor 24 where the synchronization is effected at the output sampling frequency Fso, and apart from the comparator 23 which does not form part of the direct chain of treating the received echo information signal. The supply of the signal Fsi to the elements other than comparator 23 and multiplexer 24 is not shown, FIG. 2, in order to avoid complexity of the drawing. The input signal Ni of the filters 13, 14, 15 symbolizes the presence of multiple delays 1/Ni (1/Ni=T) as will be explained hereinafter with reference to FIGS. 4a and 4b. The signal Ni which also appears at the input of the velocity measuring device 11 symbolises in the latter the presence of delays 1/Ni necessary for averaging on N−M successive correlations as already described. The correlation, a device 11, is effected in known manner, preferably as described in European Patent Application 0 225 667 which corresponds to commonly owned U.S. Pat. No. 4,803,990 (incorporated herein by reference). It relates to a correlation 1 bit. For each velocity sampling to determine $S'_1$ from two given consecutive "shots" (see FIG. 3 of the present application a temporal window is defined having a width w which gathers a constant predetermined number of input samples, for example, 32, the correlation being effected bit by bit between the two windows which are set with respect to each other exactly at the duration T, that is to say which correspond between two consecutive "shots". For the next velocity sampling, the two windows of the two considered "shots" are set at a predetermined number of sampling input periods, for example, 4, which implies an important recovery from one window to the next. This is symbolized for the supply of the clock signal Fso to the velocity measuring device 11. The amplitude detectors 16, 17, 18, the comparator 23 and the multiplexor 24 are, as far as they are concerned, synchronized by the clock signal Fso in such a manner that the sequencing of the comparator and consequently of the multiplexor is effected at a high frequency which is the same as the frequency of the velocity samplings of output $S'_1$. Said high frequency permits, by means of subsequent known correlation, averaging and interpolation operations of evading problems of discontinuity on the velocity profiles which might occur during the commutation of the output signal from one filter to another.

Each amplitude detector calculates the energy $AM(t_o)$ produced during the duration of a window according to the relation $$AM(t_0) = \sum_{t_0}^{t_0+W} D(t)$$

D(t) being the output signal of the filter in question.

The 23 permanently produces the comparison between the signals AM1, AM2, AM3 obtained at the rhythm Fso at the output of the detectors 16, 17, 18, supplies the control signal CO of the multiplexor and the resulting amplitude $A_R(t_0)$, for example:

$$A_R(t_0) = Max\ [AM1(t_0), AM2(t_0), AM3(t_0)].$$

The two signals CO and $A_R$ are sampled at the output frequency Fso of the device; said two signals are calculated at each recurrent output period 1/No of the device. The three amplitude detectors and the comparator are set at the initial position at each output recurrence 1/No. The signal CO calculated at the same rhythm is applied to the multiplexor at each output recurrence period 1/Ni in such a manner that the multiplexing is constant during the calculation of the velocity profile. The signal $A_R$ is used in a known manner in the velocity measuring device 11, in association with amplitude threshold circuits to confirm or reveal the validity of the calculated velocity points, i.e. to effect a segmentation operation of the searched velocity profile. It is to be noted that the delays produced by the delay 19, 21, 22 must each be at least equal to the duration w of the analysis window, that duration also being that which is necessary for the estimation of the amplitudes AM1, AM2, AM3. So the delayed signals $D^1j$, $D^2j$, $D^3j$ are made synchronous with the control signal CO of the multiplexor 24.

Figure 4A:
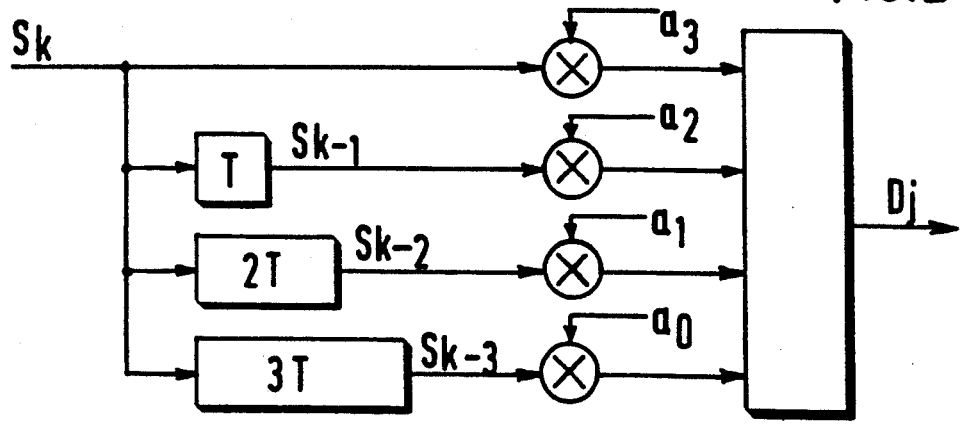
FIGS. 4a and 4b show the structures of filters for eliminating fixed echoes according to the invention.

FIG. 4a shows the theoretical structure of each of the filters F1, F2, F3 used according to the invention. FIG. 4b is a practical embodiment of the filter. for eliminating fixed echoes having 4 coefficients $a_0$, $a_1$, $a_2$, $a_3$ (n=4). It is to be noted that the signals reflected by a moving target verify, from one recurrent input period to the next:

$$S_{k+1}(t) = S_k(t-\tau)$$

$\tau$ being the temporal setting between successive signals of the movement of the target:

$$\tau = \frac{2VT}{C}$$

Figure 4B:
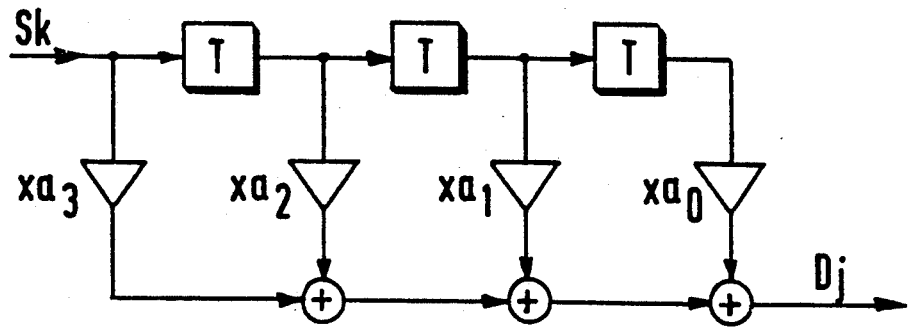

V: speed of the target.
In complex notation:

$$S_{k+1} = S_k e^{-j\phi}$$

$$\phi = 4\pi Nc\ VT/C$$

in which:
$N_c$: frequency of the echographic signal during the pulse,
V: velocity of the blood flow corresponding to the selected filter,
T: recurrence period of the pulse of the echographic signal,
C: velocity of the sound in the analyzed medium,
The output signal of each filter is expressed by:

$$Dj = \sum_{k=0}^{n} a_k S_k$$

$$Dj = So \sum_{k=0}^{n} a_k e^{-jk\phi}$$

as is shown by the conventional structure of the filters shown in FIGS. 4a and 4b. It can be shown that the signal-to-noise ratios SNR of the input and output of the filters verify the relation:

$$SNR_0 = \frac{\left| \sum_{k=0}^{n} a_k e^{-jk\phi} \right|}{\sqrt{\sum_{k=0}^{n} a_k^2}} \times SNR_1 \quad 1)$$

so:

$$\frac{SNR_0}{SNR_1} = A(\phi) = \frac{\left| \sum_{k=0}^{n} a_k e^{-jk\phi} \right|}{\sqrt{\sum_{k=0}^{n} a_k^2}} \quad 2)$$

Amelioration of the signal-to-noise ratio between the input and the output of each filter F1, F2, F3 is obtained by making the ratio $A(\phi)$ maximum, while respecting the condition of eliminating fixed echoes:

$$\sum_{k=0}^{n} a_k = 0$$

On the other hand, in order to obtain a correct amplitude comparison between the various researched filters, the output amplitude is normalized by the constant K;

$$\sqrt{\sum_{k=0}^{n} a_k^2} \quad 3)$$

where $$K = \sum_{K=0}^{n} a_K^2$$

In an equivalent manner it suffices to impose the constraint:

$$\sum_{k=0}^{n} a_k^2 = 1$$

Another constraint which presents itself besides those expressed by the relations (1) and (3) consists for the search of the coefficients $a_k$ of imposing a dynamic on the coefficients, as already described hereinbefore. So theoretically one would have a different filter to be determined for each velocity point of the velocity profile to be established, which would prove to be impracticable for the design of the circuit, the respect of the three constraint mentioned above leads experimentally to the groups of filters the characteristics of which are near, for each group, and it is possible to choose for each group a particular filter the coefficients of which are expressed in a simple manner, the particular filter being chosen to cover a particular range of velocities. So one is led to choose three filters of which the response curve combined in amplitude as a function of the velocities is shown in solid lines in FIG. 5 for a recurrence input frequency Ni of 5 kHz. This combined response is constituted by the parts of the curve in solid lines which meet two by two: RF1, RF2, RF3. The filter F1, with steep front, is selected by the multiplexor 24 for measuring the lowest velocities (up to 16 cm/s; its coefficeints are:
$a_0=2/\sqrt{10}$, $a_1=1/\sqrt{10}$, $a_2=-1/\sqrt{10}$, $a_3=-2/\sqrt{10}$
The filter F 2 is selected for measuring the velocities between 16 cm/s and 25 cm/s; its coefficients are:
$a_0=\frac{1}{2}$, $a_1=-\frac{1}{2}$, $a_2=-\frac{1}{2}$, $a_3=\frac{1}{2}$
The filter F3, selected for measuring velocities higher than 25 cm/s, has as coefficients:
$a_0=\frac{1}{2}$, $a_1=-\frac{1}{2}$, $a_2=\frac{1}{2}$, $a_3=-\frac{1}{2}$
For the three filters is (see relation (3)): K=1.

Figure 5:
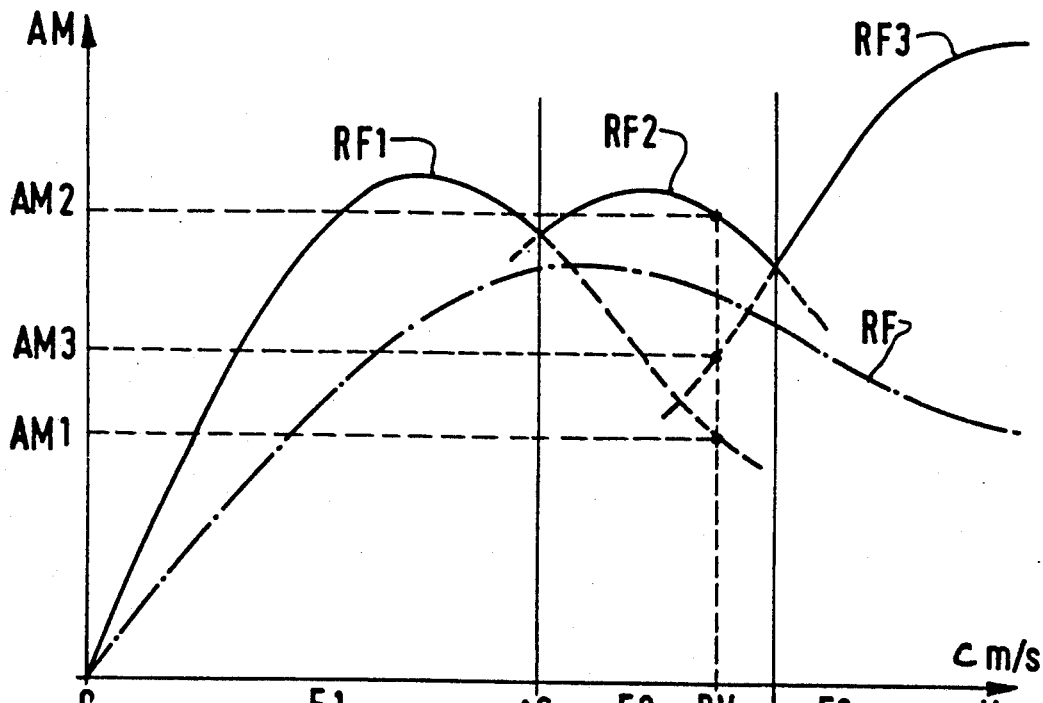
FIG. 5 shows the response curve of a prior art filter and of three parallel filters according to the invention.

FIG. 5 also shows for a particular velocity point, PV, the manner in which the selection of the filter works which provides at the output the signal having the highest amplitude, in this case AM2 provided by the filter F2. The combined response of the three filters RF1-RF2-RF3 for the elimination of fixed echoes may be compared with the response curve RF shown in a dot-and-dash line in FIG. 5. The curve RF is the response of a single known filter for eliminating fixed echoes having three coefficients ($a_0=2$, $a_1=-1$, $a_2=-1$) which is not satisfactory neither for the low velocities (absence of a steep front), nor for the high velocities (low amplitudes).

Figure 6A:
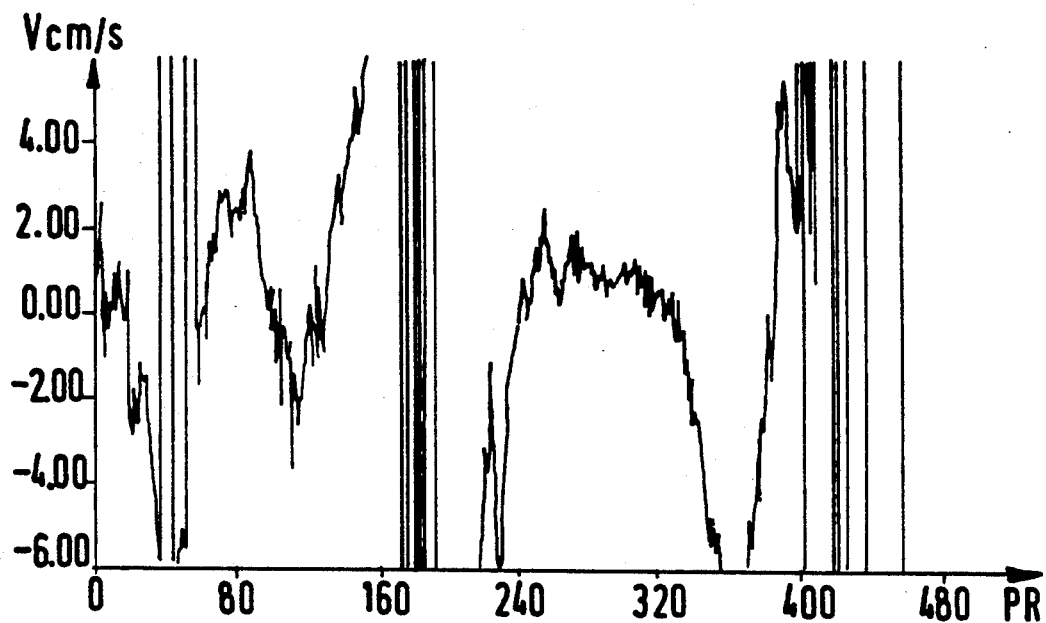
FIGS. 6a and 6b shows velocity profiles obtained for and in the proximity of the popliteal artery, at FIG. 6a for the prior art (filter for eliminating a fixed echo having 3 coefficients), at FIG. 5 according to the invention.
Figure 6B:
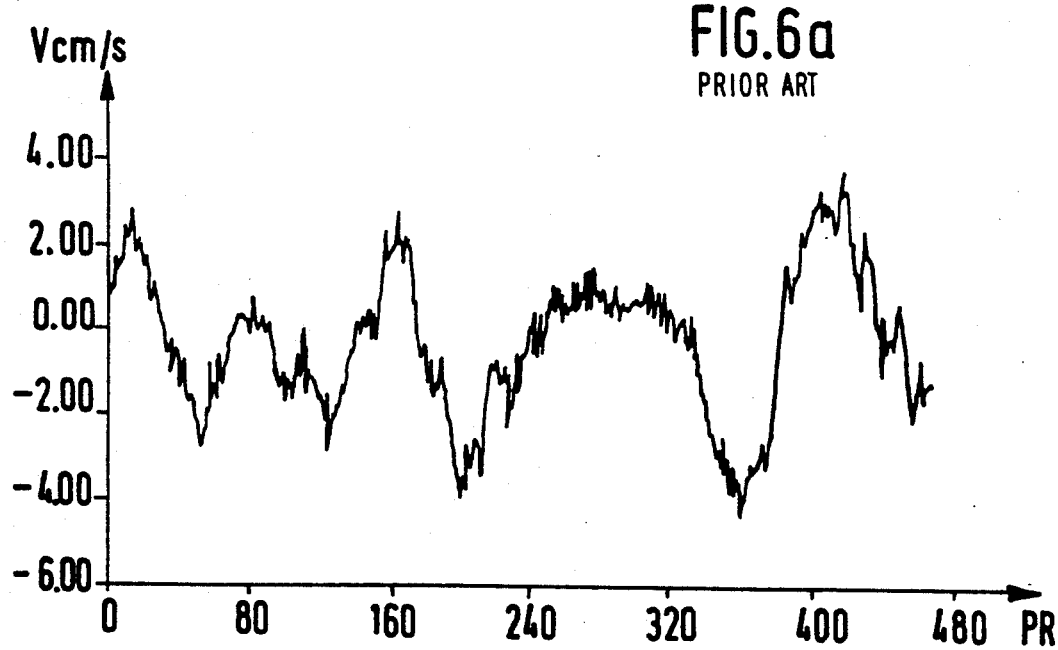

FIGS. 6a and 6b show velocity profiles obtained for and in the proximity of the popliteal artery, in FIG. 6a using a single conventional filter having three coefficients of the type indicated in the previous paragraph, and in FIG. 6b according to the invention. The abscissae represent the depth PR in number of points, the abscissa 400 corresponding to the depth 15 mm. The parts of the profiles situated in the proximity of the abscissa 280 account for the blood flow in the popliteal artery and that situated in the proximity of the abscissa 100 accounts for the blood flow in an arteriole. The velocity profile of FIG. 6b which does not present discontinuities contrary to that of FIG. 6a is nearer to the physical reality of the displacements in the analysed media, with respect to the latter, and shows the superiority of the filter of the F1 type over the response filter RF, in the lowest velocity range. The device according to the invention also permits, in a manner not shown, providing velocity profiles suitable for a velocity range varying from 0 to 30 cm/s and more as is the case, for example, for the blood flow in the carotid artery.

What is claimed is:

1. A filter device for eliminating fixed echoes for an ultrasonic echographic system, said system including means for generating recurrent pulse emission and including intercorrelation and interpolation means for the determination of velocity profiles of moving media, said system further including filter means including delay lines for eliminating fixed echoes of the passband type, said filter device comprising:
a plurality of parallel passband filter means, each for eliminating said fixed echoes in an output signal thereof, said output signal of the different filter means exhibiting different amplitudes, the passband of the filter means being juxtaposed;
comparator means having an input for issuing an output control signal;
amplitude detector means connected to the output of each of said filter means and to the input of said comparator means;
multiplexor means; and
a plurality of delay means, a different delay means connected between the output of a different corresponding filter means and said multiplexor means; said multiplexor means for receiving the control signal issued by said comparator means to select at the output of said multiplexor means in response to said control signal applied thereto that one among the output signals of said filter means which has the highest amplitude.

2. A device for eliminating fixed echoes as claimed in claim 1 wherein said filter means for eliminating fixed echoes each are have coefficients, the sum of the coefficients being zero.

3. A device for eliminating fixed echoes as claimed in claim 2 wherein the filter means for eliminating fixed echoes each have four coefficients and comprise:
a filter for low velocities whose coefficients are $a_0=2/\sqrt{10}, a_1=1/\sqrt{10}, a_2=-1/\sqrt{10}, a_3=-2/\sqrt{10}$,
a filter for medium velocities with coefficients $a_0=\frac{1}{2}, a_1=-\frac{1}{2}, a_2=-\frac{1}{2}, a_3=\frac{1}{2}$,
a filter for high velocities with coefficients $a_0=\frac{1}{2}, a_1=-\frac{1}{2}, a_2=\frac{1}{2}, a_3=-\frac{1}{2}$.

4. The device of claim 2 further including said means for generating said recurrent pulse emission coupled to said filter means.

5. A device for eliminating fixed echoes as claimed in claim 1 wherein said filter means for eliminating fixed echoes have n coefficients of which sum of the n coefficients is zero, so $$\sum_{K=0}^{n} a_k = 0,$$

said filter means being designed and selected to make the function of the signal-to-noise ratio between the output and the input of the filter means $A(\phi)$ maximum:

$$A(o) = \frac{\left| \sum_{k=0}^{n} a_k e^{-jk\phi} \right|}{\sum_{k=0}^{n} a_k^2}$$

with $\phi = 4\pi N_c VT/C$ wherein:
$N_c$: frequency of the echographic signal during the pulse,
V: blood flow rate corresponding to the selected filter,
T: pulse recurrence frequency of the echographic signal,
C: sound velocity in the analyzed medium,
the sum of the squares of the coefficients being normed:

$$\sum_{k=0}^{n} a_k^2 = 1$$

6. A device for eliminating fixed echoes as claimed in claim 5 wherein the filter means for eliminating fixed echoes each have four coefficients and comprise:

a filter for low velocities whose coefficients are $a_0=2/\sqrt{10}, a_1=1/\sqrt{10}, a_2=-1/\sqrt{10}, a_3=-2/\sqrt{10}$, a filter for medium velocities with coefficients $a_0=-\frac{1}{2}, a_1=-\frac{1}{2}, a_2=-\frac{1}{2}, a_3=\frac{1}{2}$, a filter for high velocities with coefficients $a_0=-\frac{1}{2}, a_1=-\frac{1}{2}, a_2=\frac{1}{2}, a_3=-\frac{1}{2}$.

7. The device of claim 6 further including said means for generating said recurrent pulse emission coupled to said filter means.

8. The device of claim 5 further including said means for generating said recurrent pulse emission coupled to said filter means.

9. A device for eliminating fixed echoes as claimed in claim 1 wherein the filter means for eliminating fixed echoes each have four coefficients and comprise:

a filter for low velocities whose coefficients are $a_0=2/\sqrt{10}, a_1=1/\sqrt{10}, a_2=-1/\sqrt{10}, a_3=-2/\sqrt{10}$, a filter for medium velocities with coefficients $a_0=-\frac{1}{2}, a_1=-\frac{1}{2}, a_2=-\frac{1}{2}, a_3=\frac{1}{2}$, a filter for high velocities with coefficients $a_0=-\frac{1}{2}, a_1=-\frac{1}{2}, a_2=\frac{1}{2}, a_3=-\frac{1}{2}$.

10. The device of claim 1 further including said means for generating said recurrent pulse emission coupled to said filter means.

* * * * *